(12) United States Patent  (10) Patent No.: US 7,858,260 B2
Lee et al.  (45) Date of Patent: Dec. 28, 2010

(54) POLYMER ELECTROLYTE MEMBRANE AND METHOD OF PRODUCING THE SAME

(75) Inventors: Myung-jin Lee, Seoul (KR); Hee-young Sun, Yongin-si (KR); Myung-dong Cho, Hwaseong-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1260 days.

(21) Appl. No.: 11/434,719

(22) Filed: May 17, 2006

(65) Prior Publication Data

US 2006/0280984 A1   Dec. 14, 2006

(30) Foreign Application Priority Data

Jun. 14, 2005  (KR) .................. 10-2005-0051117

(51) Int. Cl.
 *H01M 8/10*  (2006.01)
 *B01J 39/18*  (2006.01)
(52) U.S. Cl. ........................ 429/492; 521/27
(58) Field of Classification Search ........................ None
 See application file for complete search history.

(56) References Cited

U.S. PATENT DOCUMENTS

2004/0186189 A1* 9/2004 Muller et al. .................. 521/27

FOREIGN PATENT DOCUMENTS

| JP | 2001-294706 | | 10/2001 |
|----|-------------|---|---------|
| JP | 2001-325970 | | 11/2001 |
| JP | 2002-083514 | * | 3/2002 |
| JP | 2004-171994 | | 6/2004 |
| JP | 2006-221873 | | 8/2006 |
| JP | 2006-324252 | | 11/2006 |
| WO | WO 2004/066428 | | 8/2004 |

* cited by examiner

*Primary Examiner*—Jonathan Crepeau
(74) *Attorney, Agent, or Firm*—Lee & Morse, P.C.

(57) ABSTRACT

A polymer electrolyte membrane for use in a fuel cell and a method of producing a polymer electrolyte membrane. The method includes preparing a phosphate monomer solution by dissolving an initiator and a phosphate monomer containing at least one phosphoric acid group and at least one unsaturated bond in a solvent, impregnating a porous polymer matrix with the phosphate monomer solution, polymerizing the impregnated phosphate monomer, and impregnating the result of polymerization with a phosphoric acid.

7 Claims, 7 Drawing Sheets

POLYMER ELECTROLYTE MEMBRANE AND METHOD OF PRODUCING THE SAME

CROSS-REFERENCE TO RELATED APPLICATIONS

This application claims the benefit of Korean Application No. 2005-51117, filed Jun. 14, 2005, in the Korean Intellectual Property Office, the disclosure of which is incorporated herein by reference.

BACKGROUND OF THE INVENTION

1. Field of the Invention

An aspect of the present invention relates to a polymer electrolyte membrane for use with a fuel cell and a method of producing the same, and, more particularly, to a fuel cell polymer electrolyte membrane having relatively excellent mechanical strength and a substantially improved liquid holding capability and a method of producing the same.

2. Description of the Related Art

A group of fuel cells form an energy generating system in which a chemical reaction energy between oxygen, and hydrogen of a hydrocarbon-based material, such as methanol, ethanol, or natural gas, is directly converted into an electrical energy. According to an electrolyte that is used, fuel cells may be categorized into phosphoric acid type fuel cells, molten carbonate type fuel cells, solid oxide type fuel cells, polymer electrolyte membrane fuel cells (PEMFCs), alkali type fuel cells, and the like. These fuel cells operate based on similar principles, but have different fuels, different operating temperatures, different catalysts, different electrolytes, etc.

Among these fuel cells, PEMFCs, which have recently been developed, have better energy output properties, lower operating temperatures, faster start-ups, and quicker response times than the other fuel cells. Due to these advantages, the PEMFC has a wide range of applications, such as being portable power sources for cars, individual power sources for homes or buildings, and small power sources for electronic devices.

Conventionally, a PEMFC includes a polymer electrolyte membrane having a polymer electrolyte, such as a perfluorosulfonate polymer (for example, NAFION produced from Dupont Inc.) that has a main chain of an alkylene fluoride and a side chain of vinyl ether fluoride terminated with a sulfonic acid group. It is noteworthy that the polymer electrolyte membrane has high ionic conductivity by holding a proper amount of water must be considered.

In order to prevent dryness of the polymer electrolyte membrane of the PEMFC, the conventional PEMFC operates at 100° C. or less, for example, at approximately 80° C. However, operating at such low temperatures results in problems which will now be described. A hydrogen-rich gas, which is mainly used as a fuel for a PEMFC, may be obtained by reforming an organic fuel, such as natural gas or methanol. In this case, however, the hydrogen-rich gas contains CO as well as $CO_2$ as a by-product. The CO poisons catalysts contained in a cathode and an anode. When a catalyst is poisoned with CO, its electrochemical activity decreases significantly. Thus, the operation efficiency and lifetime of the PEMFC decrease significantly. Moreover, the catalyst is more readily poisoned when the operating temperature of the PEMFC is lower.

Meanwhile, when the operating temperature of the PEMFC is increased to about 150° C. or higher, the poisoning of the catalyst due to CO may be avoided and the temperature of the PEMFC may be easily controlled. As a result, a fuel reformer may be miniaturized and a cooling device may be simplified. Thus, the entire energy generating system of a PEMFC may be miniaturized. However, a conventional electrolyte membrane, that is, a polymer electrolyte membrane composed of, for example, a perfluoro sulfonate polymer (for example, NAFION produced from Dupont Inc.) that has a main chain of a alkylene fluoride and a side chain of vinyl ether fluoride terminated with a sulfonic acid group, experiences a significant drop in performance due to evaporation of moisture at such a high temperature. In addition, a polymer containing a sulfonic acid group fails to maintain its original form at about 120° C. or higher. As a result, the polymer electrolyte membrane formed using the perfluoro sulfonate polymer cannot act as an electrolyte membrane at such high temperatures.

In order to solve this problem, non-humidified polymer electrolytes that operate at high temperatures have been actively researched mainly based on a polybenzimidazole (PBI)-phosphoric acid system that uses a phosphoric acid ($H_3PO_4$) as a proton conductor.

The PBI-phosphoric acid system swells by holding a phosphoric acid in a polymer matrix, and repeatedly shrinks and swells during use. However, since a PBI matrix is susceptible to shrinking and swelling due to its relatively small mechanical strength, the PBI matrix is easily broken or damaged. In a conventional PBI-phosphoric acid system, an ortho-phosphoric acid dissolves in water generated by reactions between hydrogen ions and oxygen and leaks. Thus, the ionic conductivity of an electrolyte membrane decreases, and, when a fuel cell operates for a long time at a high temperature, the polymer matrix dissolves in the phosphoric acid. In other words, at high temperature, the polymer matrix loses water through a condensation reaction of phosphoric acid molecules and forms a polyphosphoric acid. The formed polyphosphoric acid decreases ionic conductivity and dissolves a polymer electrolyte membrane.

SUMMARY OF THE INVENTION

An aspect of the present invention provides a polymer electrolyte membrane having an excellent mechanical strength and a substantially improved liquid holding capability.

Another aspect of the present invention provides a simple, efficient method of producing the polymer electrolyte membrane.

Another aspect of the present invention provides a membrane electrode assembly including the polymer electrolyte membrane.

Another aspect of the present invention provides a fuel cell including the polymer electrolyte membrane.

According to an aspect of the present invention, there is provided a polymer electrolyte membrane for use with a fuel cell, the polymer electrolyte membrane including: a porous polymer matrix; a phosphate polymer, which is a polymer of a monomer containing a phosphoric acid group, distributed in the porous polymer matrix; and a phosphoric acid distributed in the porous polymer matrix.

According to another aspect of the present invention, there is provided a method of producing a polymer electrolyte membrane, the method including: preparing a phosphate monomer solution by dissolving an initiator and a phosphate monomer containing at least one phosphoric acid group and at least one unsaturated bond in a solvent; impregnating a porous polymer matrix with the phosphate monomer solution: polymerizing the impregnating phosphate monomer; and impregnating the result of polymerization with a phosphoric acid.

According to yet another aspect of the present invention, there is provided a membrane electrode assembly including: a cathode including a catalyst layer and a diffusion layer; an anode including a catalyst layer and a diffusion layer; and the polymer electrolyte membrane according to the present invention being interposed therebetween.

According to still another aspect of the present invention, there is provided a fuel cell including: a cathode including a catalyst layer and a diffusion layer; an anode including a catalyst layer and a diffusion layer; and the polymer electrolyte membrane of the present invention being interposed therebetween.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A polymer electrolyte membrane that is used to form a fuel cell according to an embodiment of the present invention includes: a porous polymer matrix; a phosphate polymer, which is a polymer of a phosphoric acid group-containing monomer, distributed in the porous polymer matrix; and a phosphoric acid distributed in the porous polymer matrix.

The porous polymer matrix may be a hydrophilic material itself or one that has been subjected to a hydrophilic treatment. The hydrophilic porous polymer matrix or the hydrophilic treatment-subjected porous polymer matrix may be more easily impregnated with the phosphate monomer, thereby facilitating formation of a phosphate polymer. In addition, such porous polymer matrixes are suitable to be impregnated with a phosphoric acid in a subsequent process. When the porous polymer matrix is not a hydrophilic material, the porous polymer matrix may be subjected to a hydrophilic treatment to be hydrophilic. It is understood that the hydrophilic treatment discussed above is not intended to limit the scope of this application and that other hydrophilic treatments may be used.

It is further understood that the porous polymer matrix discussed above is not intended to limit the scope of the application and that it may be substituted for with a fluorine-based polymer, a polyimide-based polymer, polyetherimide-based polymer, polyphenylenesulfide-based polymer, polysulfone-based polymer, polyethersulfone-based polymer, a polyetherketone-based polymer, a polyetheretherketone-based polymer, or a polyphenylquinoxaline-based polymer. For example, the porous polymer matrix may be a fluorine-based polymer such as polytetrafluoroethylene.

The phosphate polymer is a polymer of a phosphoric acid group-containing a monomer and is distributed in the porous polymer matrix. In particular, the phosphate polymer may be uniformly or non-uniformly distributed in the entire porous polymer matrix.

The density of the phosphate polymer may increase toward surfaces of the polymer electrolyte membrane. Since the phosphate polymer prevents the phosphoric acid from leaking, a polymer electrolyte membrane having higher density of the phosphate polymer at surfaces thereof exhibits an improved liquid holding capability.

Figure 1:
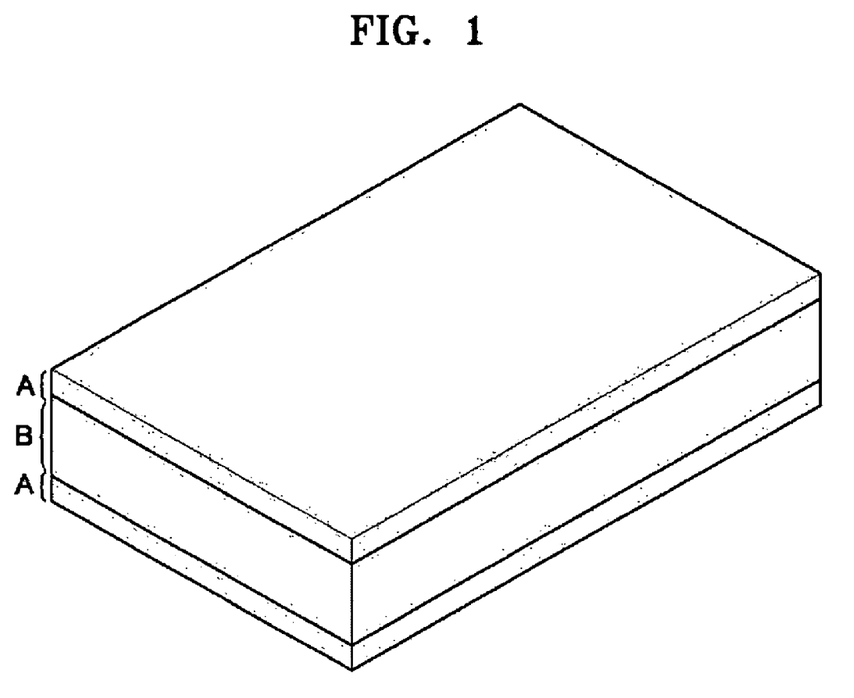
FIG. 1 is a perspective view of a polymer electrolyte membrane according to an embodiment of the present invention.

In particular, an average density of a phosphate polymer contained in regions on the surfaces of the polymer electrolyte membrane extending to depths of 20% of the entire thickness of the polymer electrolyte membrane (A of FIG. 1) is 1.5-100 times, and, according to an embodiment of the invention, 3-50 times an average density of a phosphate polymer contained in a remaining portion of the polymer electrolyte membrane having thickness of 60% of the entire thickness of the polymer electrolyte membrane (B of FIG. 1.)

When the average density of a phosphate polymer contained in surface regions of the polymer electrolyte membrane extending to depths of 20% of the entire thickness of the polymer electrolyte membrane is less than 1.5 times the average density of a phosphate polymer contained in a remaining portion of the polymer electrolyte membrane having thickness of 60% of the entire thickness of the polymer electrolyte membrane, improving the liquid holding capability is difficult. Thus, the efficiency of a cell may decrease.

On the other hand, when the average density of a phosphate polymer contained in surface regions of the polymer electrolyte membrane extending to depths of 20% of the entire thickness of the polymer electrolyte membrane is greater than 100 times the average density of a phosphate polymer contained in surface regions of the polymer electrolyte membrane extending to depths of 20% of the entire thickness of the polymer electrolyte membrane, the polymer electrolyte membrane is too thick. Thus, resistance increases, ionic conductivity decreases, and the cell performance decreases.

The phosphoric acid may be distributed in the entire porous polymer matrix and uniformly distributed in the entire polymer electrolyte membrane. In particular, the concentration of the phosphoric acid may increase toward to the center of the polymer electrolyte membrane in a thickness direction. That is, since the density of the phosphate polymer is relatively greater at the surfaces of the polymer electrolyte membrane, more phosphoric acid is located at the center of the polymer electrolyte membrane in a thickness direction.

The phosphate polymer of which density increases toward surfaces of the porous polymer matrix holds the phosphoric acid that is mainly distributed at the center of the membrane in the thickness direction so that the phosphoric acid does not leak out.

A method of producing the polymer electrolyte membrane according to an embodiment of the present invention will now be described in detail.

The method of producing the polymer electrolyte membrane according to an embodiment of the present invention includes: preparing a phosphate monomer solution by dissolving an initiator and a phosphate monomer containing at least one phosphoric acid group and at least one unsaturated bond in a solvent; impregnating a porous polymer matrix with the phosphate monomer solution: polymerizing the impregnating phosphate monomer; and impregnating the result of the impregnating operation with a phosphoric acid.

Here, it is understood that the phosphate monomer containing at least one phosphoric acid group and at least one unsaturated bond is not intended to limit the scope of this application and that other monomers are possible. The phosphoric acid group is represented by formula 1:

[Formula 1]

The phosphate monomer may have a single phosphate acid group or two or more phosphate acid groups.

The unsaturated bond of the phosphate monomer may be a double bond or a triple bond. In more detail, the bond may be any bond that allows for the formation of a polymer through polymerization. The phosphate monomer may have a single unsaturated bond or two or more unsaturated bonds.

The phosphate monomer may be a C2-C20 olefine-based monomer. In particular, the phosphate monomer may be a C2-C20 alkene-based monomer, a C2-C20 alkyne-based monomer, a C3-C20 (meth)acrylate-based monomer, a C4-C20 di(meth)acrylate-based monomer, a C8-C20 styrene-based monomer or a mixture of these. However, it is understood that the present invention is not limited to these monomers and that other monomers may be used.

For example, the phosphate monomer may be a C6-20 alkyleneglycol methacrylate phosphate represented by formula 2:

[Formula 2]

where R is a linear or branched C2-C16 hydrocarbon.

According to an embodiment of the invention, the phosphate monomer is ethylene glycol methacrylate phosphate (EGMP), which is represented by formula 3, or propylene glycol methacrylate phosphate (PGMP), which is represented by formula 4a or formula 4b:

[Formula 3]

[Formula 4a]

[Formula 4b]

The phosphate monomer may have a molecular weight of 100-800. When the molecular weight of the phosphate monomer is less than 100, the flexibility of a connecting side chain may decrease. On the other hand, when the molecular weight of the phosphate monomer is greater than 800, the flexibility of the connecting side chain excessively increases. Thus, the mechanical property of the membrane may deteriorate.

It is understood that the present invention is not limited to the initiators discussed herein and that other initiators are possible. For example, the initiators may be any initiator that is suitable for radical polymerization of a polymer. The initiator may be azobisisobutyronitrile (AIBN), benzoyl peroxide (BPO), or benzoin ethyl ether.

The amount of the phosphate monomer may be in the range of 3-50 parts by weight and the amount of the initiator may be in the range of 0.3-10 parts by weight, based on 100 parts by weight of the porous polymer matrix. When the amount of the phosphate monomer is less than 3 parts by weight, the amount of a phosphate polymer to be formed is so small that sufficient performance cannot be obtained. When the amount of the phosphate monomer is greater than 50 parts by weight, the amount of the phosphate polymer to be formed is so great that an electrode is rendered thick. When the amount of the initiator is less than 0.3 parts by weight, the reaction occurs slowly, which is inefficient. When the amount of the initiator is greater than 10 parts by weight, a degree of polymerization decreases. Thus, a mechanical property of the membrane deteriorates.

The phosphate monomer and the initiator are dissolved in a solvent to produce a phosphate monomer solution. However, the solvent is not limited to any particular solvent, and may be any solvent that is commonly used in the art. Examples of the solvent include, but are not limited to dimethylacetamide (DMAc), dimethylformamide, dimethylsulfoxide (DMSO), N-methylpyrrolidone (NMP), and tetrahydrofurane (THF).

A porous polymer matrix is impregnated with the phosphate monomer solution prepared, as described above. According to embodiments of the invention, the method of impregnation is not limited to those methods described herein and may include other methods known in the art. For example, the porous polymer matrix may be immersed in the phosphate monomer solution. Alternatively, the porous polymer matrix may be doped or sprayed with the phosphate monomer solution several times.

Subsequently, the impregnated phosphate monomer solution is polymerized under proper conditions. The polymerizing method may be a thermal polymerization or a UV polymerization, but is not limited to either embodiment.

A thermal polymerization may be used in a space where a high temperature may be maintained constant. The thermal polymerization may be performed at about 60-120° C. for about 20-80 minutes (mins.). When the temperature for the thermal polymerization is less than 60° C. or the time for the thermal polymerization is less than 20 mins, polymerization is insufficiently performed. Thus, the polymer electrolyte membrane to be formed may have a poor phosphoric acid-holding capability. When the temperature for the thermal polymerization is greater than 120° C., the polymerization reaction is non-uniformly carried out so that the mechanical property of a phosphate polymer to be produced deteriorates. In addition, when the time for the thermal polymerization is greater than 80 mins., polymerization may not be further performed, which is not economical.

The UV polymerization is performed by irradiating ultraviolet (UV) rays to the impregnating phosphate monomer solution. UV rays may be irradiated using a UV lamp for about 5-60 min. In this case, UV rays may be irradiated onto both surfaces of the membrane to reduce the manufacturing time.

When the irradiation time is less than 5 mins, the UV polymerization may be insufficiently performed. Thus, a polymer electrolyte membrane to be produced may have a poor phosphoric acid-holding capability. When the irradiation time is greater than 60 mins., polymerization may not be further performed, which is not economical.

The wavelength of UV rays irradiated from the UV lamp may be in the range of 300-380 nm. When the wavelength of UV rays is less than 300 nm, the energy of the UV rays is so high that the polymerization may be interrupted. On the other hand, when the wavelength of UV rays is greater than 380 nm, the reaction is made to occur slowly, which is inefficient.

The resulting solution of the polymerization of the impregnated phosphate monomer solution is then impregnation with a phosphoric acid. However, it is noted that the impregnating method described above is not intended to limit the scope of the application and that any method commonly known in the art may be employed. For example, the result of the polymerization of the impregnated phosphate monomer solution may be immersed in a phosphoric acid solution. When the resulting solution of the polymerization is impregnated with the phosphoric acid, a phosphoric acid permeates into the polymerized phosphate polymers to be distributed in the entire membrane. The time for impregnation may vary according to a thickness of the result of polymerization prepared, the time for polymerization, and the distribution of the phosphate polymer. In consideration with these conditions, the time for impregnation may be in the range of 10 mins. to 3 hours.

A membrane electrode assembly may be produced using the polymer electrolyte membrane produced according to an embodiment of the present invention, as described above. That is, a membrane electrode assembly, which includes a cathode including a catalyst layer and a diffusion layer, an anode including a catalyst layer and a diffusion layer, and the polymer electrolyte membrane according to the present invention formed between the cathode and the anode, may be produced using a conventional method that is known in the art. In other words, the catalysts and diffusion layers of the cathode and anode are not limited, and may be any catalyst and diffusion layer that are known in the art, respectively.

In addition, by using the polymer electrolyte membrane, according to the present invention prepared, as described above, a fuel cell may be produced. That is, a fuel cell, which includes a cathode including a catalyst layer and a diffusion layer, an anode including a catalyst layer and a diffusion layer, and the polymer electrolyte membrane, according to the present invention, interposed with the cathode and the anode, may be produced using a conventional method that is known in the art. Again, the catalysts and diffusion layers of the cathode and anode are not limited, and may be any catalyst and diffusion layer that are known in the art, respectively.

A polymer electrolyte membrane, according to aspects of the present invention, has excellent mechanical strength and a substantially improved liquid holding capability. In addition, the polymer electrolyte membrane may be produced in-situ and may be formed to a small thickness. Thus, a slimmer fuel cell may be produced.

Aspects of the present invention will now be described in further detail with reference to the following examples and comparative examples. These examples are for illustrative purposes only and are not intended to limit the scope of the present invention. Physical properties were measured using the following method in Examples and Comparative Examples.

Ionic Conductivity

After the phosphoric acid was used, ionic conductivity was measured by measuring a resistance at a varying temperature when a voltage bias of 10 mV was applied at a frequency of 1 Hz-1 MHz.

EXAMPLE 1

6 g of an ethyleneglycol methacrylate phosphate (EGMP) monomer and 0.33 g of benzoin ethyl ether were dissolved in 100 ml of THF by mixing for 30 minutes to produce a phosphate monomer solution. 20 g of a hydrophilic treated PTFE was immersed in the phosphate monomer solution for 30 minutes, and then removed therefrom.

The resulting hydrophilic treated PTFE was UV polymerized for 20 minutes using a UV lamp having a wavelength of 360 nm.

Figure 2A:
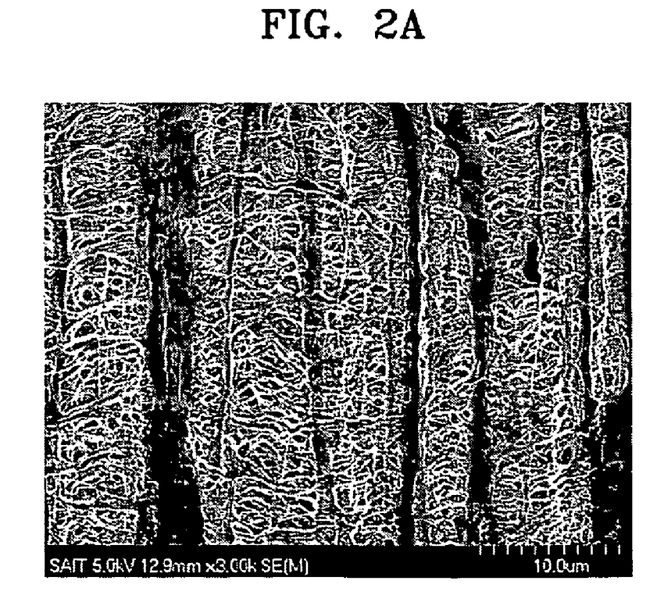
FIGS. 2A through 2C are images of the surface of a polymer electrolyte membrane produced according to Example 1 before polymerization, after polymerization, and when washing was performed immediately after polymerization, respectively.
Figure 2B:
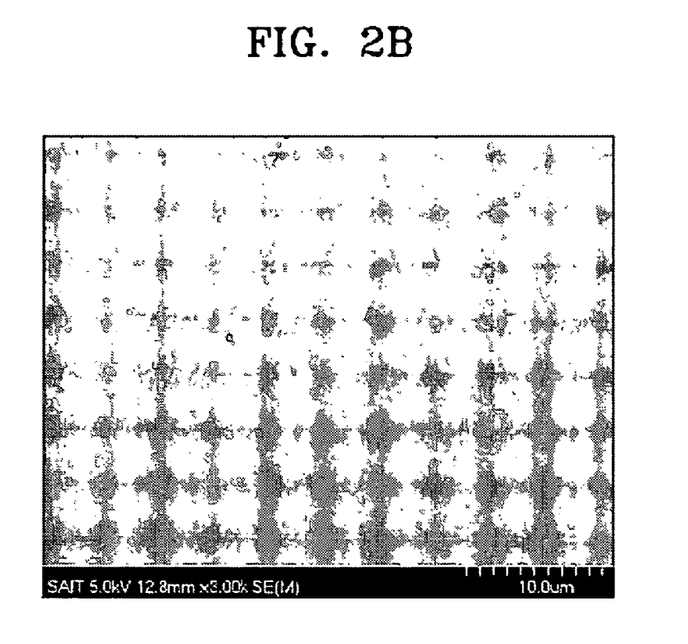
Figure 2C:
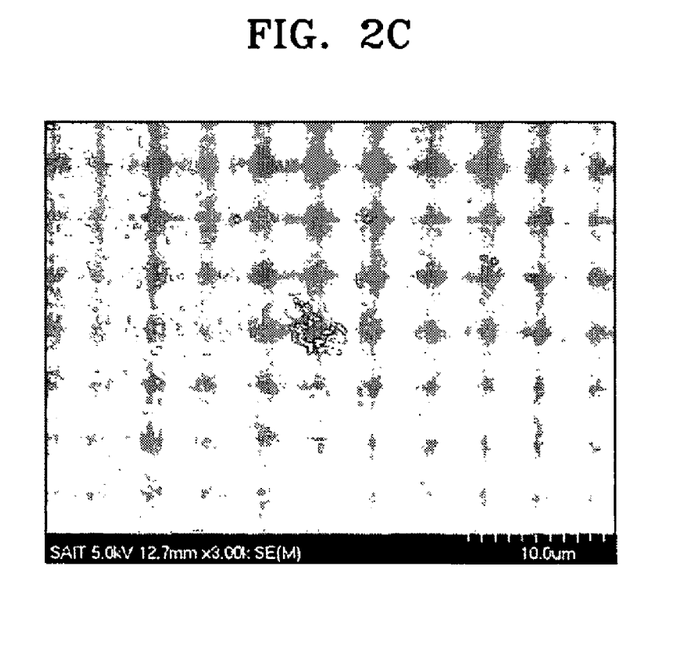

The polymerized result was washed with deionized water. Surfaces of the result before polymerization, after polymerization, and when washing was performed immediately after polymerization are respectively shown in FIGS. 2A through 2C. FIG. 2A is an image of the surface of a porous polymer matrix. FIG. 2B is an image of the surface of a phosphate polymer formed in the porous polymer matrix after polymerization and before washing. FIG. 2C is an image of the surface of the phosphate polymer after washing.

The result of polymerization prepared as described above was impregnated with a 85% phosphoric acid for one hour at 80° C. to produce a polymer electrolyte membrane. Then, the ionic conductivity of the polymer electrolyte membrane was measured as described above, and the results are shown in FIGS. 4 and 5.

Figure 6A:
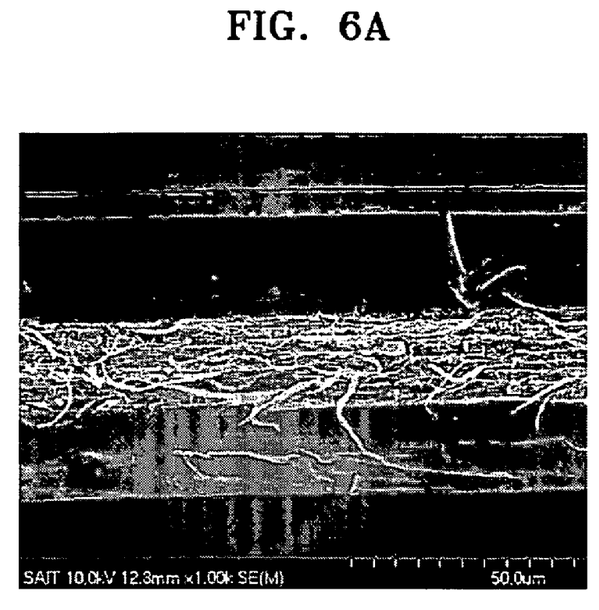
FIGS. 6A through 6C are enlarged sectional views of the result of polymerization prepared according to Example 1.
Figure 6B:
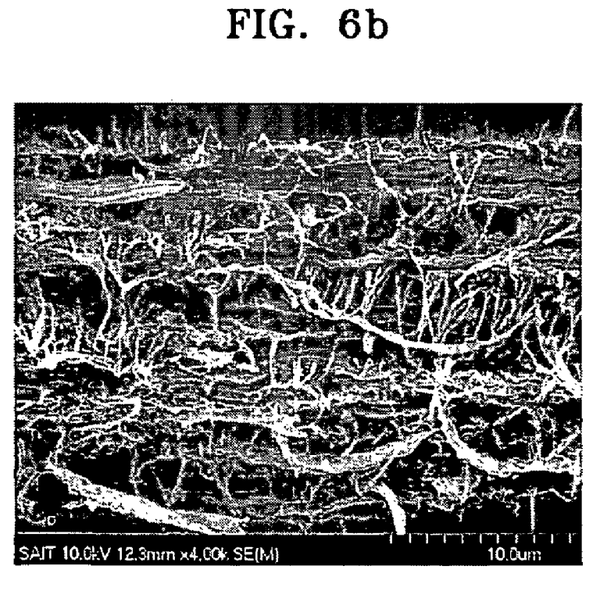
Figure 6C:
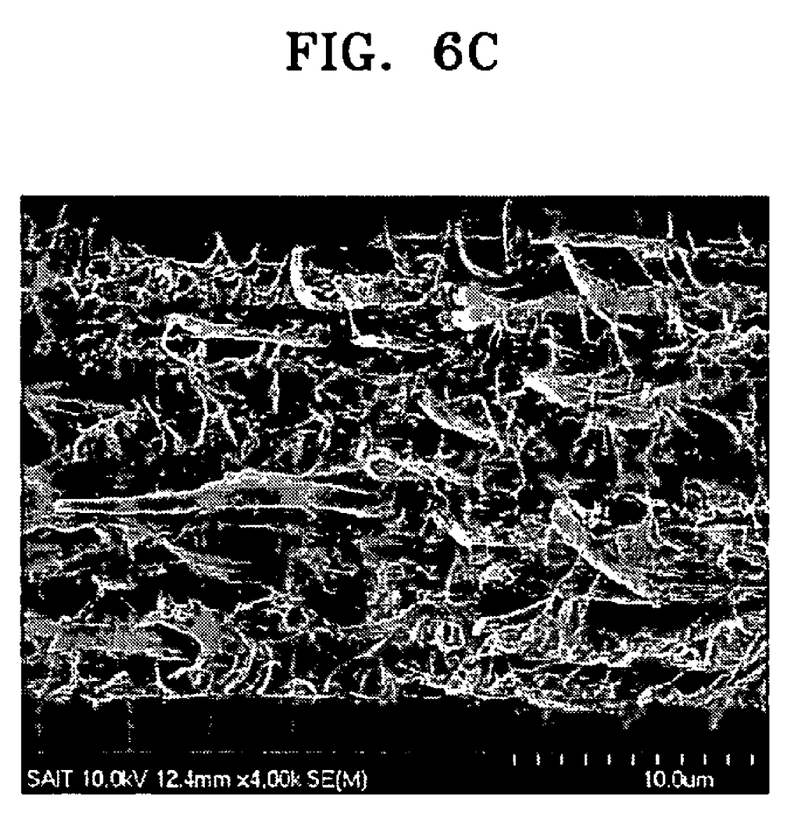

Sectional views of the result of polymerization are shown in FIGS. 6A through 6C. As shown in FIG. 6A, the phosphate polymer layer is relatively thick along two surfaces over the entire membrane. FIG. 6B is an enlarged image of a central portion of the result of polymerization. As shown in FIG. 6B, a phosphate monomer is permeated into and polymerized into pores of the porous polymer matrix. FIG. 6C is an image of the result of polymerization impregnated with water instead of the phosphoric acid, which is capable of corroding a photographing apparatus.

EXAMPLE 2

6 g of an ethyleneglycol methacrylate phosphate (EGMP) monomer and 0.44 g of AIBN were dissolved in 100 ml of THF by a mixing process for 30 minutes to produce a phosphate monomer solution. 20 g of a hydrophilic treated PTFE was immersed in the phosphate monomer solution for 30 minutes, and then removed therefrom. The resulting hydrophilic treated PTFE was polymerized in a vacuum oven at 80° C. for 60 minutes.

Figure 3A:
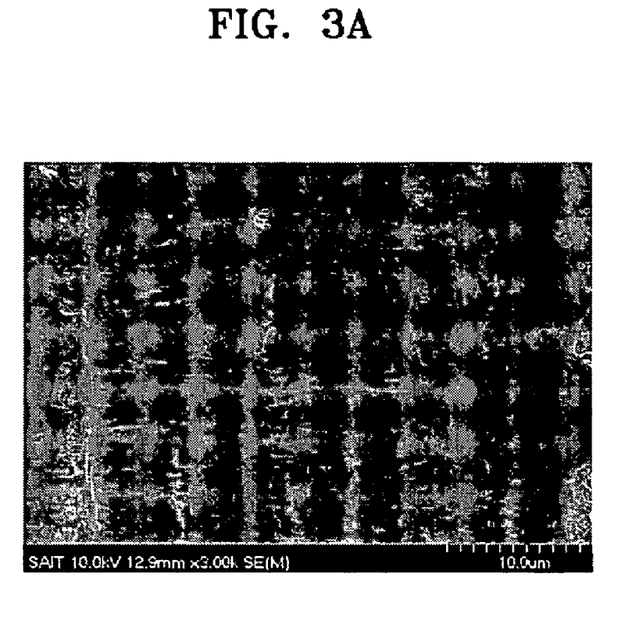
FIGS. 3A and 3B are images of the surface of a polymer electrolyte membrane produced according to Example 2 after polymerization, and when washing was performed immediately after washing, respectively.
Figure 3B:
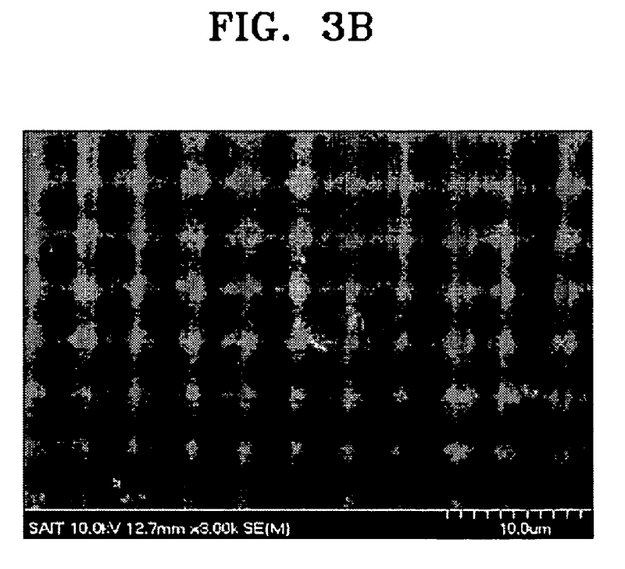

The result of polymerization prepared as described above was washed with deionized water. FIGS. 3A and 3B are images of surfaces of the result of polymerization before washing and after the washing, respectively. FIG. 3A is an image of the result of polymerization in the porous polymer matrix before being washing. Referring to FIG. 3A, a phosphate polymer was formed and a porous polymer matrix may be observed through the phosphate polymer. FIG. 3B is an image of the surface of the phosphate polymer after being washed.

COMPARATIVE EXAMPLE 1

A hydrophilic treated PTFE membrane was impregnated with only phosphoric acid at 80° C. for one hour. The ionic conductivity of the resulting PTFE electrolyte membrane was measured in the same manner as described above, and the results are shown in FIG. 4.

COMPARATIVE EXAMPLE 2

A PBI membrane was impregnated with only phosphoric acid at 60° C. for 30 hours. The ionic conductivity of the resulting PBI electrolyte membrane was measured in the same manner as described above, and the results are shown in FIGS. 4 and 5.

Figure 4:
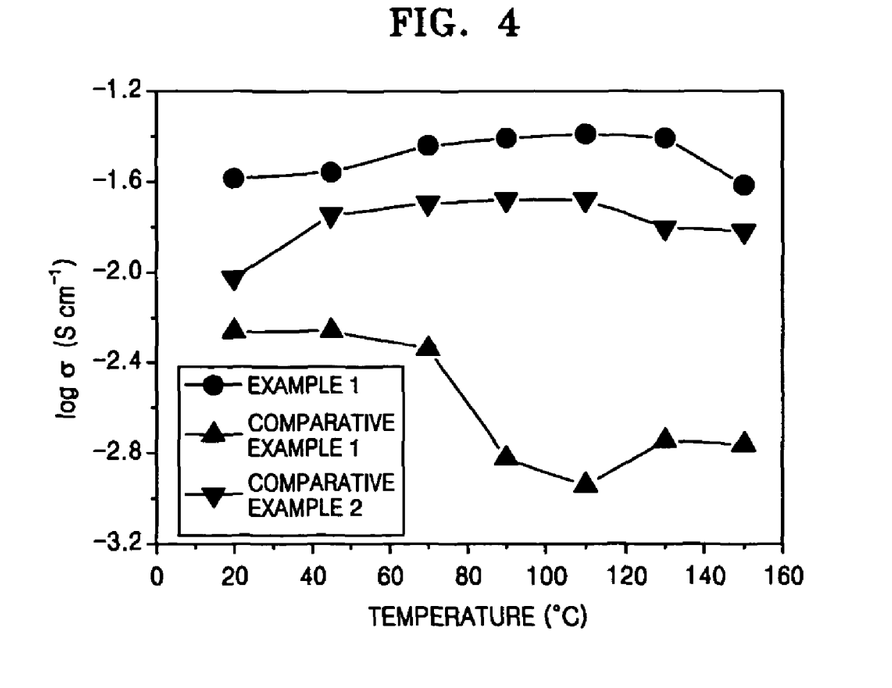
FIG. 4 shows ionic conductivities of polymer electrolyte membranes produced according to Example 1, and Comparative Examples 1 and 2.

As shown in FIG. 4, the polymer electrolyte membrane of Example 1 had much higher ionic conductivity than polymer electrolyte membranes of Comparative Examples 1 and 2. In particular, the polymer electrolyte membrane of Example 1 exhibited excellent ionic conductivity even at high temperatures because the phosphate polymer formed at the surface of the polymer electrolyte membrane can prevent the leakage of phosphoric acid.

COMPARATIVE EXAMPLE 3

A polymer electrolyte membrane was prepared in the same manner as in Example 1, except that a polyethyleneglycol methacrylate (PEGMA) was used instead of ethyleneglycol methacrylate phosphate in the same amount, and 0.24 g of benzoin ethylether was used as an initiator.

PEGMA, which is represented by formula 5, has similar structure with the EGMP used to produce the polymer electrolyte membrane according to an embodiment of the present invention except that the PEGMA contains no phosphoric acid group:

[Formula 5]

Accordingly, by comparing the polymer electrolyte membranes obtained using EGMP and PEGMA, the effect of the phosphate functional group may be found. The ionic conductivity of the polymer electrolyte membrane prepared using the PEGMA was measured, and the results are shown in FIG. 5.

Figure 5:
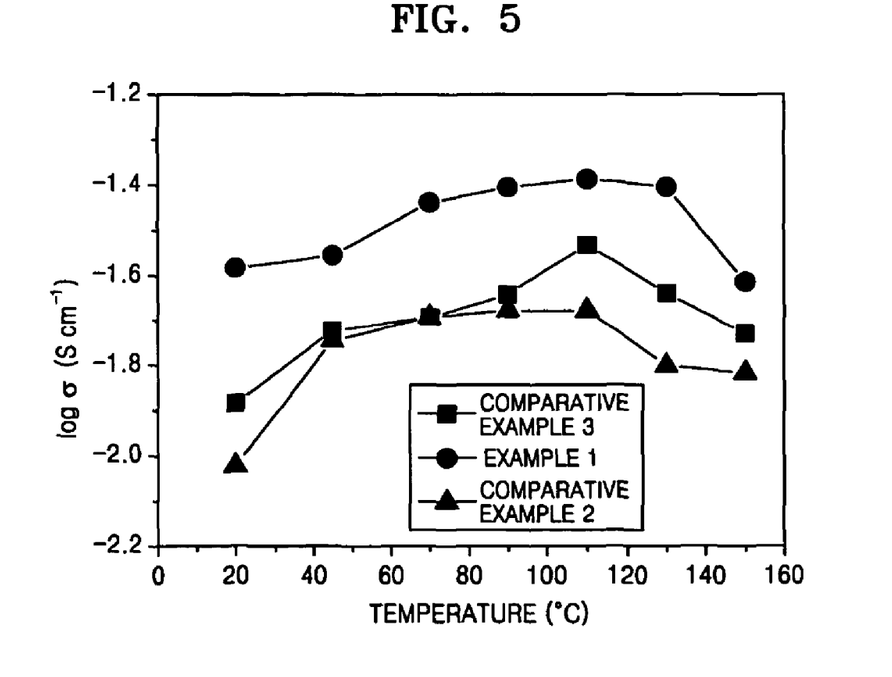
FIG. 5 shows ionic conductivities of polymer electrolyte membranes produced according to Example 1, and Comparative Examples 2 and 3.

As shown in FIG. 5, the polymer electrolyte membrane of Example 1 exhibited much higher ionic conductivity than the polymer electrolyte membranes according to Comparative Example 2 and Comparative Example 3 where PEGMA was used. That is, it was found that the phosphate polymer formed at the surface of the polymer electrolyte membrane, according to an embodiment of the present invention, held the impregnated phosphoric acid and increased ionic conductivity due to a phosphate group contained in the phosphate polymer.

EXAMPLE 3

Figure 7:
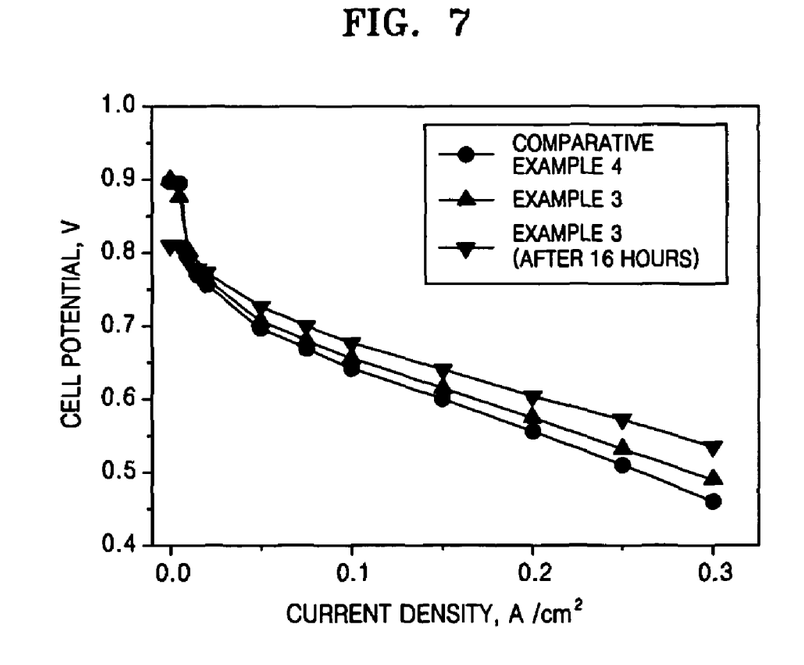
FIG. 7 is a graph illustrating performance test results of unit cells prepared according to Example 3 and Comparative Example 4.

A unit cell was produced using the polymer electrolyte membrane prepared according to Example 1 and an electrode (produced from E-TEK Inc.). The amount of a catalyst impregnated in the electrode was 2 mg/cm$^2$. The cell potential with respect to the current density was measured in a non-humidified condition while 100 ccm of hydrogen and 300 ccm of oxygen were supplied, and the results are shown in FIG. 7. Also, after 16 hours, cell performance was again measured, and the results are also shown in FIG. 7 to show the stability of the system.

COMPARATIVE EXAMPLE 4

Figure 8:
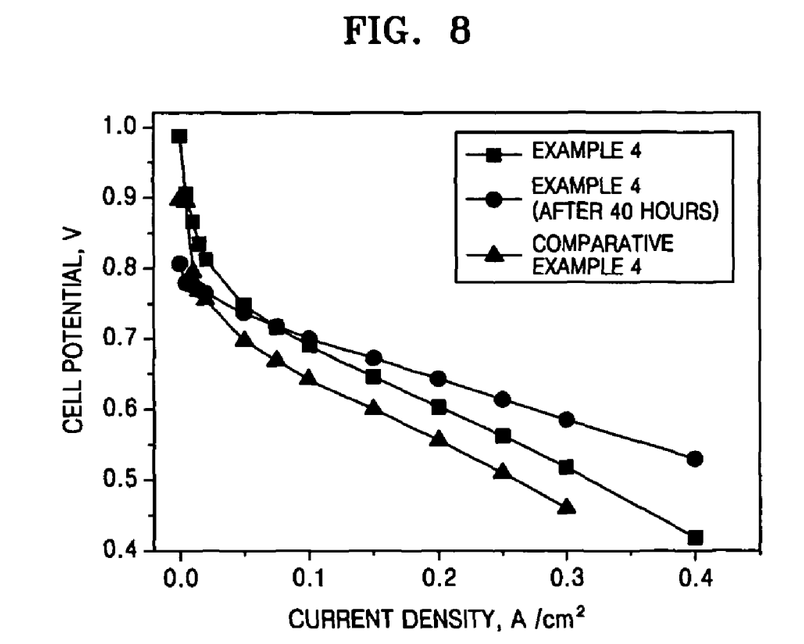
FIG. 8 is a graph illustrating performance test results of unit cells prepared according to Example 4 and Comparative Example 4.

A unit cell was produced in the same manner as in Example 3, except that the polymer electrolyte membrane prepared in Comparative Example 2 was used. The cell voltage with respect to the current density of the unit cell was measured, and the results are shown in FIGS. 7 and 8.

As shown in FIG. 7, the unit cells produced according to Example 3 exhibited greater efficiency than the unit cell produced according to Comparative Example 4. In particular, better performance was obtained as the current density increased. In addition, it was found that the performance of the unit cell, according to an embodiment of the present invention, becomes more stable with aging.

The unit cell produced according to Comparative Example 4 was left sit for 16 hours to obtain the ionic conductivity after 16 hours as measured in Example 3, but the performance after 16 hours could not be measured because holes were formed in the membrane. Accordingly, it was found that the polymer electrolyte membrane, according to an embodiment of the present invention, had better mechanical strength and chemical resistance than that formed in Comparative Example 4.

EXAMPLE 4

A unit cell was prepared in the same manner as in Example 3 except that the polymer electrolyte membrane prepared in Example 2 was used. The cell potential with respect to the current density was measured, and the results are shown in FIG. 8. Also, after 40 hours, cell performance was again measured, and the results are shown in FIG. 8 to show the stability of the system.

As shown in FIG. 8, the unit cells produced according to Example 4 exhibited greater efficiency than the unit cell produced according to Comparative Example 4. In particular, the performance was improved at low current density due to a decrease in an active overvoltage. Therefore, the performance was improved through entire current density range. When the unit cell was aged, its performance became more stable.

EXAMPLE 5

A polymer electrolyte membrane was prepared in the same manner as in Example 1, except that the phosphoric acid solution was impregnated for 4 hours. A pressure of 6 kg/cm$^2$ was applied to the polymer electrolyte membrane using a hot press apparatus to measure a liquid holding capability based on weight variation. This was carried out at 150° C. to find high-temperature effects on the liquid holding property. The results are shown in Table 1.

COMPARATIVE EXAMPLE 5

A polymer electrolyte membrane was prepared in the same manner as in Comparative Example 1 except that the phosphoric acid solution was impregnated for 4 hours. The liquid holding capability of the polymer electrolyte membrane was measured in the same manner as in Example 5. The results are shown in Table 1:

TABLE 1

| | Initial weight | After 2 hours | After 4 hours | After 8 hours | After 12 hours | Decreasing Rate (%) |
|---|---|---|---|---|---|---|
| Example 5 | 1.132 | 1.117 | 1.083 | 1.048 | 0.995 | 12.1 |
| Comparative Example 5 | 0.654 | 0.612 | 0.582 | 0.533 | 0.489 | 25.2 |

As shown in Table 1, the polymer electrolyte membrane, according to an embodiment of the present invention, exhibited twice the liquid holding capability of the conventional polymer electrolyte membrane. In addition, the polymer electrolyte membrane according to an embodiment of the present invention could hold a much greater amount of a phosphoric acid at an initial stage, thereby substantially increasing the performance of a cell.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A polymer electrolyte membrane for a fuel cell, the polymer electrolyte membrane comprising:
   a porous polymer matrix;
   a phosphate polymer, being a polymer of a monomer containing a phosphoric acid group, distributed in the porous polymer matrix, wherein the density of the phosphate polymer in the porous polymer matrix increases from a center of the polymer electrolyte membrane toward surfaces of the polymer electrolyte membrane; and
   a phosphoric acid distributed in the porous polymer matrix, wherein the concentration of the phosphoric acid increases toward a center of the polymer electrolyte membrane.

2. The polymer electrolyte membrane of claim 1, wherein the average density of the phosphate polymer contained in surface regions of the polymer electrolyte membrane extending to depths of 20% of the entire thickness of the polymer electrolyte membrane is 1.5 to 100 times an average density of the phosphate polymer contained in a remaining portion of the polymer electrolyte membrane having a thickness of 60% of the entire thickness of the polymer electrolyte membrane.

3. The polymer electrolyte membrane of claim 2, wherein the average density of the phosphate polymer contained in surface sides of the polymer electrolyte membrane extending to depths of 20% of the entire thickness of the polymer electrolyte membrane is 3 to 50 times the average density of the phosphate polymer contained in the remaining portion of the polymer electrolyte membrane having a thickness of 60% of the entire thickness of the polymer electrolyte membrane.

4. The polymer electrolyte membrane of claim 1, wherein the porous polymer matrix is an inherently hydrophilic material or has been subjected to hydrophilic treatment.

5. The polymer electrolyte membrane of claim 1, wherein the porous polymer, matrix is a fluorine-based polymer, a polyimide-based polymer, polyetherimide-based polymer, polyphenylenesulfide-based polymer, polysulfone-based polymer, polyethersulfone-based polymer, a polyetherketone-based polymer, a polyetheretherketone-based polymer, or a polyphenylquinoxaline-based polymer.

6. A membrane electrode assembly comprising:
   a cathode comprising a catalyst layer and a diffusion layer;
   an anode comprising a catalyst layer and a diffusion layer; and
   a polymer electrolyte membrane for use in a fuel cell, the polymer electrolyte membrane including:
      a porous polymer matrix,
      a phosphate polymer, being a polymer of a monomer containing a phosphoric acid group, distributed in the porous polymer matrix, wherein the density of the phosphate polymer in the porous polymer matrix increases from a center of the polymer electrolyte membrane toward surfaces of the polymer electrolyte membrane, and
      a phosphoric acid distributed in the porous polymer matrix, wherein the concentration of the phosphoric acid increases toward a center of the polymer electrolyte membrane.

7. A fuel cell comprising:
   a cathode comprising a catalyst layer and a diffusion layer;
   an anode comprising a catalyst layer and a diffusion layer; and
   a polymer electrolyte membrane for use in a fuel cell, the polymer electrolyte membrane including:
      a porous polymer matrix;
      a phosphate polymer, being a polymer of a monomer containing a phosphoric acid group, distributed in the porous polymer matrix, wherein the density of the phosphate polymer in the porous polymer matrix increases from a center of the polymer electrolyte membrane toward surfaces of the polymer electrolyte membrane; and
      a phosphoric acid distributed in the porous polymer matrix, wherein the concentration of the phosphoric acid increases toward a center of the polymer electrolyte membrane.

* * * * *